United States Patent
Velez et al.

(10) Patent No.: US 6,678,006 B1
(45) Date of Patent: Jan. 13, 2004

(54) METHOD AND APPARATUS FOR VIDEO PROCESSING THAT INCLUDES SUB-PICTURE SCALING

(75) Inventors: Robertson Velez, North York (CA); David Yeh, Markham (CA); Philip L. Swan, Toronto (CA); David Glen, North York (CA)

(73) Assignee: ATI Technologies, Inc., Unionville (CA)

( * ) Notice: Subject to any disclaimer, the term of this patent is extended or adjusted under 35 U.S.C. 154(b) by 0 days.

(21) Appl. No.: 09/004,022

(22) Filed: Jan. 7, 1998

(51) Int. Cl.⁷ .......................... H04N 5/445; H04N 5/45
(52) U.S. Cl. ........................ 348/564; 348/567; 348/566; 348/599
(58) Field of Search .................... 348/571, 563, 348/564, 565, 566, 567, 568, 553, 556, 561, 46–461, 581, 584, 598, 599; 345/113, 116, 327, 328, 115, 629, 634, 638, 640, 660; H04N 5/14, 9/64, 5/445, 5/45, 5/44, 5/46

(56) References Cited

U.S. PATENT DOCUMENTS

| | | | |
|---|---|---|---|
| 4,914,509 A | * | 4/1990 | Idei .......................... 348/505 |
| 5,751,371 A | * | 5/1998 | Shintani ...................... 348/468 |
| 5,900,916 A | * | 5/1999 | Pauley ........................ 348/564 |
| 5,912,710 A | * | 6/1999 | Fujimoto ..................... 348/445 |
| 5,959,684 A | * | 9/1999 | Tan et al. .................... 348/500 |
| 5,973,748 A | * | 10/1999 | Horiguchi et al. .......... 348/461 |
| 5,995,161 A | * | 11/1999 | Gadre et al. ................. 345/634 |
| 6,011,592 A | * | 1/2000 | Vaughan et al. ........ 315/368.12 |
| 6,081,264 A | * | 6/2000 | Rosen et al. ................. 345/723 |
| 6,144,362 A | * | 11/2000 | Kawai ......................... 345/629 |
| 6,144,415 A | * | 11/2000 | Patton et al. ................ 348/565 |
| 6,229,575 B1 | * | 5/2001 | Vaughan et al. ............ 345/629 |
| 6,233,393 B1 | * | 5/2001 | Yanagihara et al. ........ 348/552 |
| 6,249,547 B1 | * | 6/2001 | Boyce et al. ................ 348/567 |
| 6,285,408 B1 | * | 9/2001 | Choi et al. ................... 348/554 |
| 6,297,797 B1 | * | 10/2001 | Takeuchi et al. ............ 345/467 |
| 6,339,451 B1 | * | 1/2002 | Tults .......................... 345/611 |

\* cited by examiner

*Primary Examiner*—Sherrie Hsia
(74) *Attorney, Agent, or Firm*—Vedder, Price, Kaufman & Kammholz, P.C.

(57) ABSTRACT

A method and apparatus for processing DVD video data and sub-picture data is accomplished by storing a line of DVD video data and at least a partially decoded portion of DVD sub-picture data. The partially decoded DVD sub-picture data is still in an encoded format, which may be two bits per pixel, but line information has been decoded from the DVD subpicture data stream. Once stored, the DVD video data is retrieved from the memory and scaled to produce scaled video data. Similarly, the partially decoded sub-picture data is retrieved from memory, further decoded, and scaled to produce scaled sub-picture data. The scaled video data is blended with the scaled sub-picture data to produce a video output.

14 Claims, 6 Drawing Sheets

METHOD AND APPARATUS FOR VIDEO PROCESSING THAT INCLUDES SUB-PICTURE SCALING

TECHNICAL FIELD OF THE INVENTION

This invention relates generally to video processing and more particularly to sub-picture scaling and blending.

BACKGROUND OF THE INVENTION

Displaying typical television/video source data on computers is known. Such television video includes television broadcasts signals, cable television signals, satellite television signals, VCR signals and DVD signals. To display such traditional television signals on a computer display, the video signals must be processed according to traditional computer display processing.

For example, traditional television signals are interlaced such that one field of video data includes only an odd, or even, line of video data, while the next field includes the next even, or odd, line. Generally, graphic signals for computer displays are non-interlaced signals, as such, graphic signals include both the odd and even lines in the same frame. In addition, a television's display size is typically different than that of a computer display. For example, a standard television set is usually 720 pixels×480 pixels, 720 pixels×525 pixels, or letterbox, while a typical computer display is 640 pixels×480 pixels. As such, the traditional television video signals must be scaled, deinterlaced, and converted to a graphics format before they can be displayed on a computer monitor.

There are a variety of ways in which video data may be scaled. For example, when video data is to be upscaled (i.e., the target display is larger than the source display), pixel information may be repeated in several pixel locations to fill in the extra pixels of the upscaled display. Alternatively, pixel information may be blended within an area to fill in additional pixel locations that result from upscaling. For down-scaling, the pixel information at a given pixel location is a result of merging pixel information of surrounding pixel locations of the source display. The merging may be a blending, averaging, selecting one of the pixel as a representative pixel, or combination thereof.

When a DVD video source is to be displayed on a computer screen, wherein the DVD data includes a video data stream and a sub-picture data stream, the video data and the subpicture data are decoded and stored in a frame buffer. In a typical computer video processing circuit, the DVD video data and the DVD subpicture data (which includes buttons for controlling DVD applications, selecting different chapters, or titles within the DVD video, etc.) are decoded, stored, and blended together to produce pixel information. The pixel information is then stored in a frame buffer. Prior to displaying the pixel information on a computer monitor, it is scaled to fit the allocated display area of the computer monitor.

The most common blending technique for DVD video data and subpicture data does not includes blending of the data, but produces blended visual affects by alternating between the video data and the subpicture data. In other words, holes are provided within the DVD subpicture data and filled with the DVD video data, or vice versa. The more holes there are, the more the DVD video data is visible. While this method produces an illusion of blending without the multiple read-write operations of alpha blending (discussed below), it does so with reduced video quality when compared to alpha blending.

While alpha blending would produce a higher quality picture, it does so at a cost that is prohibitive to commercial use. In order to alpha blend the DVD video data and the DVD subpicture data, the DVD subpicture data needs to be completely decoded. As is known, the DVD subpicture data is encoded based on run length encoding, which includes a repeating pattern and how often it is repeated. Such encoding, however, does not provide an indication as to the beginning of a line within a frame, or field, of data. Thus, the DVD subpicture needs to be completely decoded and stored in a separate frame buffer from the DVD video data. Once the decoded subpicture data is obtained, it can be blended with the video data and re-written into the frame buffer. This approach requires a read-write-read operation and a substantial amount of additional memory. The read-write-read operation for commercial processors is too process intensive to allow alpha blending to be a viable commercial solution for DVD video and subpicture data blending. The additional memory required also limits the commercial viability of the alpha blending.

Therefore, it is desirable to develop a method and apparatus that blends DVD video data and DVD subpicture data without substantially increasing memory and processing requirements for video processing circuits.

DETAILED DESCRIPTION OF A PREFERRED EMBODIMENT

Generally, the present invention provides a method and apparatus for processing DVD sub-picture data. This is generally accomplished by storing a line of DVD video data and at least a partially decoded portion of DVD sub-picture data. The partially decoded DVD subpicture data is still encoded (e.g., two bits per pixel) but has been decoded enough to recapture line information. The DVD video data is retrieved from the memory as line of data, or a portion thereof, and scaled to produce scaled video data. Similarly, the partially decoded DVD sub-picture data is retrieved from memory as a line of data, or a portion thereof, decoded, and scaled to produce scaled sub-picture data. The scaled video data is blended with the scaled sub-picture data to produce a video output. With such a method and apparatus, the memory and processing needed to scale and blend DVD sub-picture data with DVD video data is substantially reduced because the DVD subpicture data is stored in an encoded format, i.e., as partially decoded data.

Figure 1:
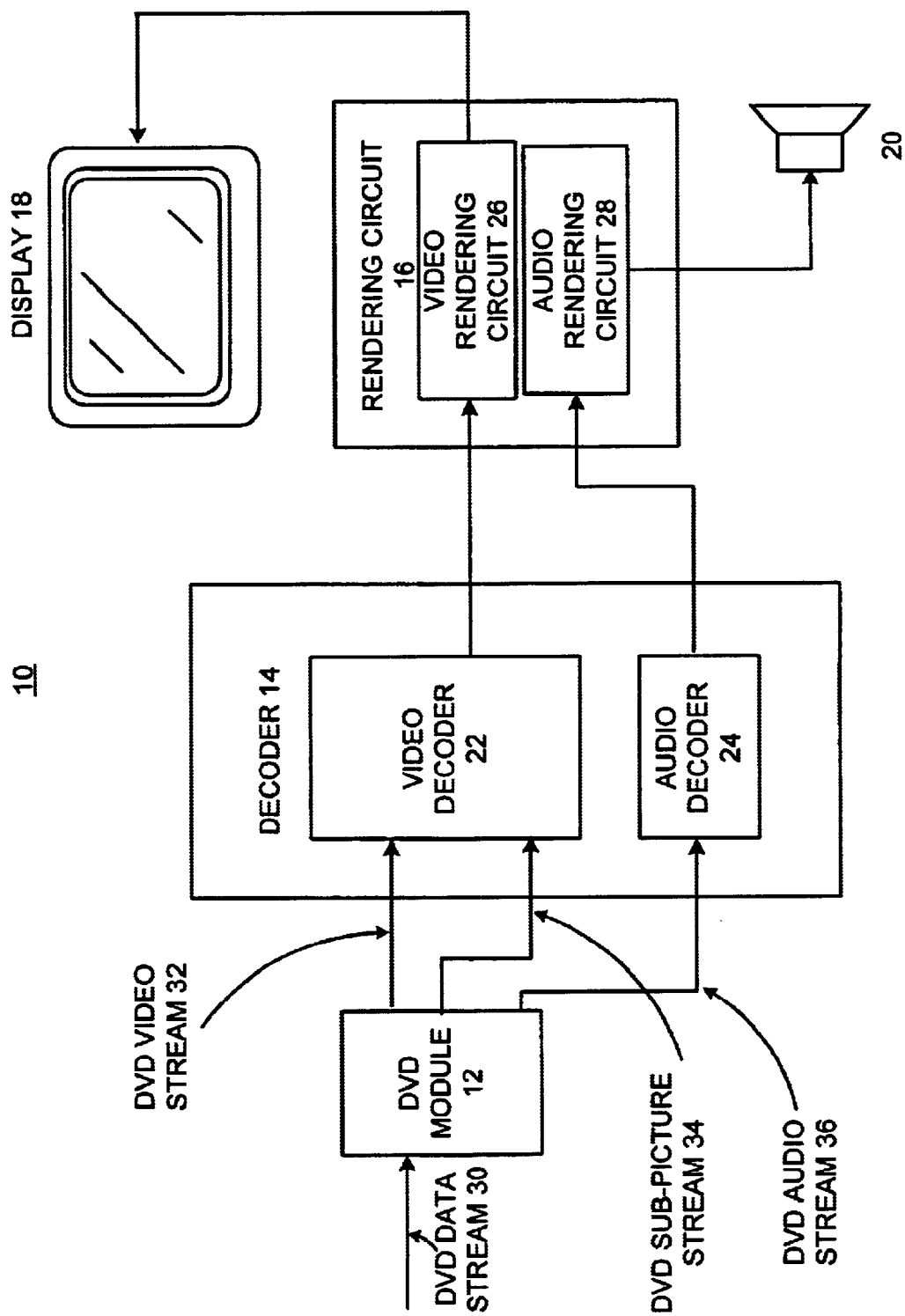
FIG. 1 illustrates a schematic block diagram of a video processing system in accordance with the present invention.

The present invention can be more fully described with reference to FIGS. 1 through 7. FIG. 1 illustrates a schematic block diagram of a video processing system 10 that includes a DVD module 12, a decoder 14, a rendering circuit 16, a display 18, and an audio rendering device 20. The display 18 may be a CRT display which is part of a computer system, while the audio rendering device 20 may be a speaker and/or audio processing system within a computer system. The display 18 receives video signals from a video rendering circuit 26 of rendering circuit 16. The video rendering circuit 26 includes, at least, a digital-to-analog converter (DAC), which receives digital video information from the decoder 14, and converts it to analog signals. The analog signals are subsequently displayed on the display 18. The speaker 20 receives analog audio signals from an audio rendering circuit of the rendering circuit 16. The audio rendering circuit 28 includes, at least, a digital-to-analog converter (DAC) which receives digitized audio signals from the decoder and converts them into analog signals.

The decoder 14 includes a video decoder 22 and an audio decoder 24. The audio decoder 24 receives DVD audio data 36 from the DVD module 12. The DVD parsing circuit 12 produces the DVD audio stream 36 as well as the DVD video stream 32 and the DVD subpicture stream 34 from a received DVD data stream 30. The separation, or parsing of, the DVD data stream 30 is done using known DVD components. The audio decoder 24, upon receiving the DVD audio stream 36, converts the DVD audio into digitized audio, which is subsequently rendered audible by the speaker 20.

The video decoder 22 receives the DVD video data stream 32 and the DVD subpicture data stream 34. The video decoder 22 decodes the DVD video data 32 and the DVD subpicture data 34 to produce digitized video, which is provided to the rendering circuit. The digitized video is subsequently displayed on display 18.

Figure 2:
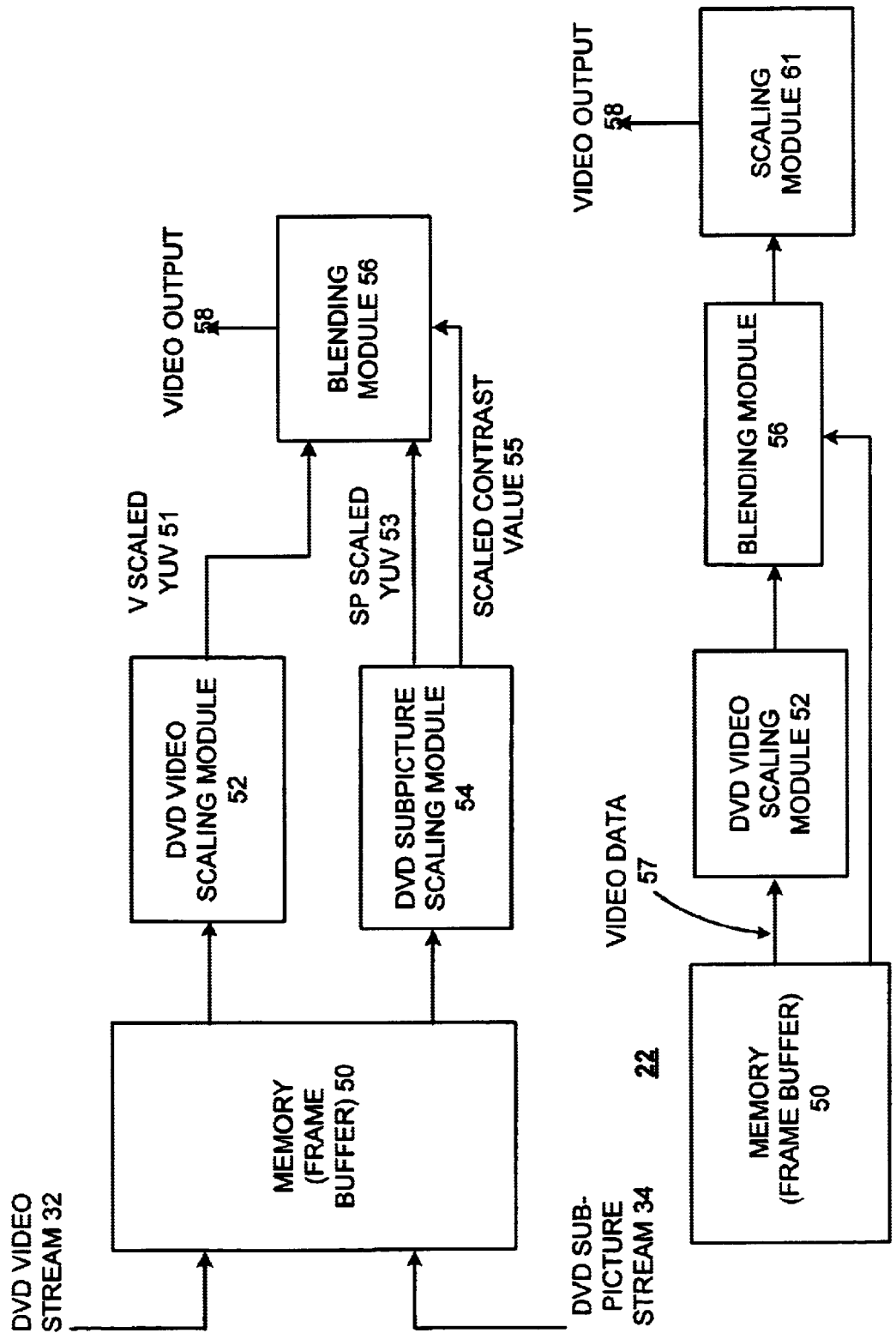
FIG. 2 illustrates schematic block diagrams of video decoders in accordance with the present invention.

The video decoder 22 is more fully described in FIG. 2, which illustrates a schematic block diagram of two versions thereof The first video decoder 22 includes a memory 50, or frame buffer, a DVD video-scaling module 52, a DVD subpicture scaling module 54, and a blending module 56. In operation, the memory 50 stores the DVD video data stream 32 (typically in a decoded format) and the DVD subpicture data stream 34 (in a partially decoded format) on a line by line basis. Note that the video graphics circuit 10 receives the DVD subpicture data stream 34 in a run-length encoded format and partially decodes it. The partially decoded DVD subpicture data is produced by decoding the run-length encoded DVD subpicture data to recapture compressed data. As is known, the run-length encoded data is encoded based on patterns of compressed data (e.g., 2 bit/pixel DVD encoded subpicture data) and how often they repeat. As such, run-length encoding of the DVD subpicture data is done in two steps, the first encodes pixel information into 2 bits/pixel compressed data and the second encodes the compressed data based on how many times it repeats in a given block (e.g., a frame, a field, a plurality of frames or fields). Thus, the partial decoding is done by reversing the second encoding step, which may be done in software and/or hardware.

The DVD video-scaling module 52 retrieves the DVD video data from memory 50 on a line by line basis or multiple line by multiple line basis. Upon receiving this information, the DVD video scaling module 52. scales it to fit the display size requirements of display 18. Note that the scaling may be upscaling (i.e., the display size of the video source is smaller than the display size of the video target), or the scaling may be down scaling (i.e., the display size of the video source is larger than the display size of the video target). The resulting scaled video data (V scaled YUV) 51 contains a Y-scaled component, a U-scaled component, and a V-scaled component. Further note that the video data may alternatively be Y, Cr, Cb video data Such scaling is known in the art, thus no further discussion of video data scaling will be presented except to further illustrate the present invention.

The DVD subpicture-scaling module 54 retrieves a line or multiple lines of the partially decoded DVD subpicture data 34. Upon retrieving this information, the DVD subpicture scaling module 54 decodes it (e.g., reverses the first step of the run-length encoding process) and then scales the completely decode data to fit the display size of the video target, i.e., display 18. .The resulting scaled subpicture data (SP scaled YUV) 53 contains a Y-scaled component, a U-scaled component, and a V-scaled component. In addition to outputting the SP scaled YUV data 53, the DVD subpicture scaling module 54 outputs a scaled contrast value (k) 55. The DVD video scaling module 52 and the DVD subpicture scaling module 54 provide their respective outputs to the blending module 56. The blending module 56 blends the video scaled YUV data 51 with the subpicture scaled YUV data 53 to produce the video output 58 based on the following equation:

$Y$output=$Y_{sp\text{-}scaled}$+$(1-k/16)$*$Y_{v\text{-}scaled}$, where $Y_{sp\text{-}scaled}$ is the $Y$ component of the subpicture scaled $YUV$ data 53 and $Y_{v\text{-}scaled}$ is the $Y$ component of the video scaled $YUV$ data 51;

$U$output=$U_{sp\text{-}scaled}$+$(1-k/16)$*$U_{v\text{-}scaled}$, where $U_{sp\text{-}scaled}$ is the $U$ component of the subpicture scaled $YUV$ data 53 and $U_{v\text{-}scaled}$ is the $U$ component of the video scaled $YUV$ data 51; and $V$output=$V_{sp\text{-}scaled}$+$(1-k/16)$*$V_{v\text{-}scaled}$, where $V_{sp\text{-}scaled}$ is the $V$ component of the subpicture scaled $YUV$ data 53 and $V_{v\text{-}scaled}$ is the $V$ component of the video scaled $YUV$ data 51.

Note that the blending of pixels may be done in a horizontal direction such that a pixel is blended with pixels in the same row. Alternatively, the pixel information may be blended in the vertical direction such that a pixel is blended with the pixels in the same column. As another alternative, a combination of horizontal and vertical blending may be used.

The bottom circuit of FIG. 2 illustrates an alternate embodiment of the video decoder 22. The decoder 22 includes the frame buffer 50, the DVD video scaling module 52, the blending module 56, and a scaling module 61. The blending module 56 blends the V scaled YUV data 51 (which has been scaled to the size of the subpicture) of the video scaling module 52 with the sub-picture video data 59. If the subpicture video data is stored in an encoded format, it must first be decoded before it is blended with the YUV video data 51. Once the data is blended, it is scaled by the scaling module 61 to fit in a display area of a computer monitor.

Figure 3:
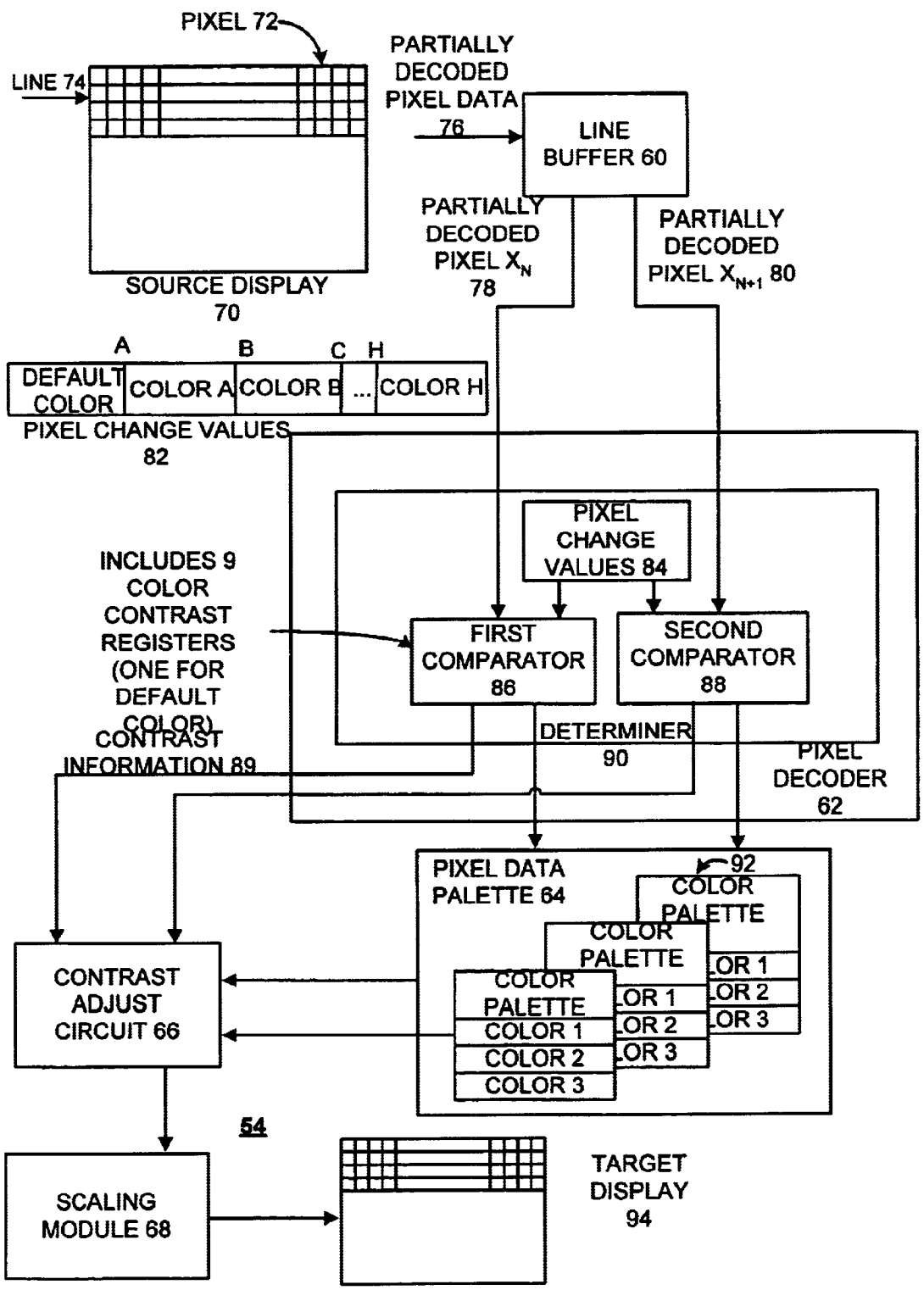
FIG. 3 illustrates a schematic block diagram of a DVD subpicture-scaling module in accordance with the present invention.

The DVD subpicture-scaling module 54 is further described in FIG. 3. The subpicture-scaling module 54 includes a line buffer 60, a pixel decoder 62, a pixel data palette 64, a contrast adjustment circuit 66, and a scaling module 68. The line buffer 60 is a buffer, or memory device that stores at least one line of partially decoded subpicture data. In many applications, the line buffer will include entries to store multiple lines such that horizontal and/or vertical blending may be achieved. In operation, the line buffer 60 receives partially decoded pixel data 76 from a source frame, or field, 70. The source frame 70, which may be stored in the frame buffer, includes a plurality of lines 74 wherein each line includes a plurality of pixels 72. In a typical television display, there will be 480 to 1440 pixels per line.

The pixel decoder 62 includes a determiner 90, which, in turn, includes a pixel change value circuit 84, a first comparator 86, and a second comparator 88. The first comparator 86 receives partially decoded pixel data for a particular pixel location $x_n$ 78. The first comparator 86 compares the pixel location, $x_n$, with pixel change values 84. The pixel change values are shown graphically as pixel change values 82 which, for each pixel change, are represented by the letters A through H. These pixel change values indicate pixel location boundaries such that pixel locations within the boundaries are affiliated with a corresponding color palette. For example, pixel locations between pixel location 0 and pixel location A correspond to a default color/contrast register, pixel locations between pixel location A and pixel location B correspond to a color/contrast register A, etc. Based on the result of the comparison between the pixel location $x_n$ with the pixel change values, the first comparator outputs, from the identified color/contrast register, pixel color data to the pixel data palette 64 and contrast information (k) 89 to contrast adjust circuit 66.

The second comparator 88 functions in a similar manner to that of the first comparator 86. The second comparator 88 compares the next pixel location $x_{n+1}$ 80 with the pixel change values. Based on this comparison, which will be discussed in greater detail below with reference to FIGS. 6 and 7, the second comparator outputs pixel color data to the pixel data palette 64 and contrast information (k) 89 to the contrast adjust circuit 66. In general, the pixel decoder 62 receives two bits of pixel information and outputs four-bit pixel color data and four-bit contrast information. Thus, as can be seen by storing the encoded representation as opposed to the decoded representation, memory requirements are reduced by a magnitude of up to four. Note that the pixel decoder 62 may process a single pixel at a time or up to at least thirty two pixels at a time.

The pixel data palette circuit 64 includes a plurality of color palettes 92 or a single color palette. Each of the color palettes 92 includes a plurality of colors. Using the four bits of information of the pixel color data, there can be four color palettes each containing four different colors, thus sixteen colors are available. As such, the pixel color data indicates which color palette to use and the color within that palette. The color palette may be identified based on the pixel change value such that one of the pixel change values indicates a particular color palette, and then within the color pallet, the remaining decoded bits indicate the particular color. Such color information may be changed on a pixel by pixel basis within the color palette for the given pixel change range. Alternatively, there may only be one color palette that includes sixteen different colors (i.e., 24 bit RGB data, YcrCb data).

Once the pixel data palette circuit 64 has identified the appropriate color information for pixel location $x_{n+}$ and pixel location of $x_{n+1}$, the color information is provided to the contrast adjusting circuit 66. The contrast adjusting circuit 66 multiplies the two pixels by the contrast information 89 to produce the output that is scaled by the scaling module 68.

Figure 4:
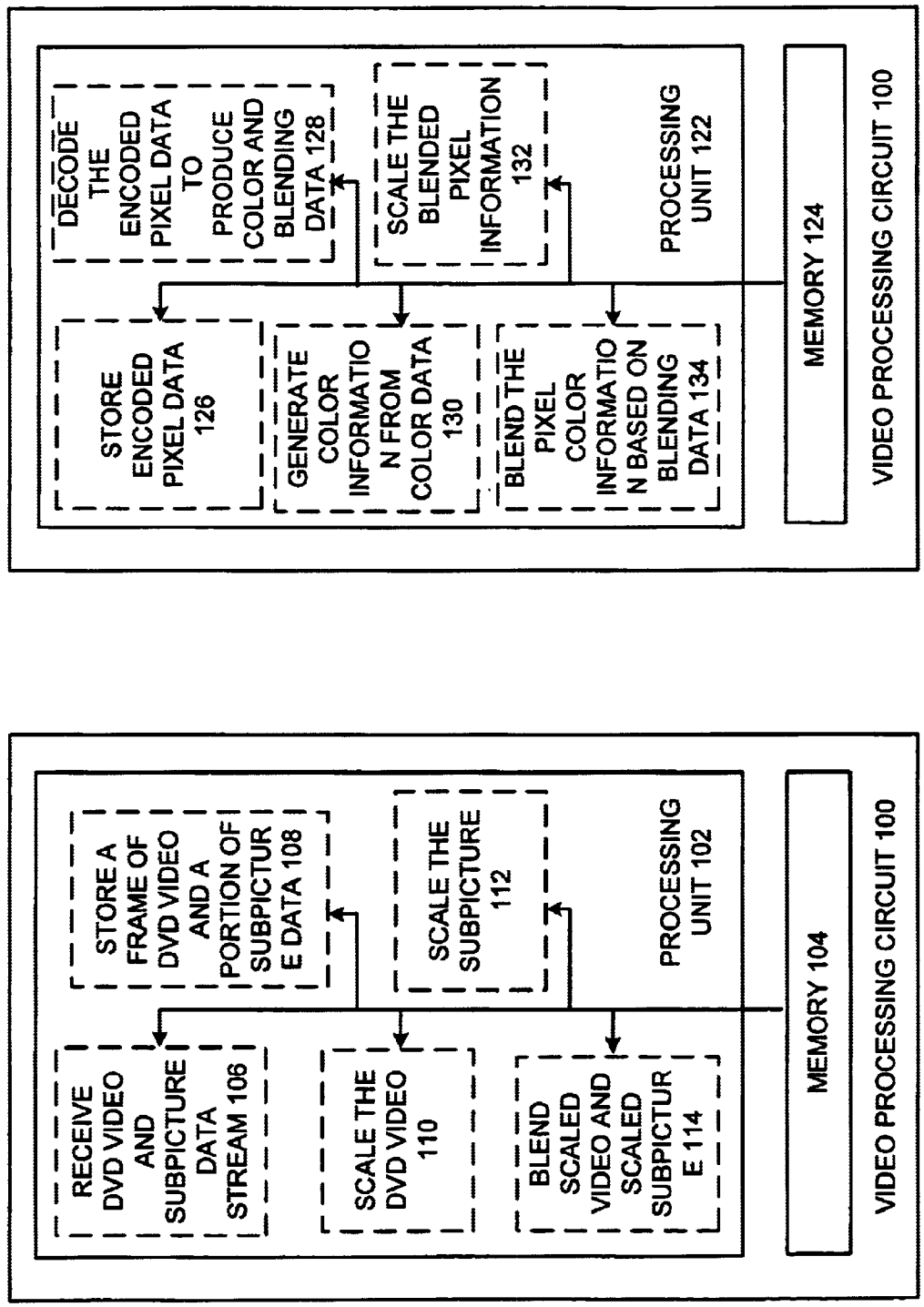
FIG. 4 illustrates a schematic block diagram of a video processing circuit and sub-picture scaling module in accordance with the present invention.

FIG. 4 illustrates a schematic block diagram of a video processing circuit 100 and a sub-picture scaling module 120. The video processing circuit 100 includes a processing unit 102 and memory 104. The processing unit 102 may be a micro-processor, a microcontroller, a microcomputer, a digital signal processor, and/or any other device that manipulates digital information based on programming instructions. The memory 104 is a random access memory, read-only memory, programmable memory, CD ROM memory, hard disk memory, floppy disk memory, magnetic memory and/or any other device that stores digital information for subsequent retrieval.

Memory 104 stores programming instructions that, when read by the processing unit 102, cause the processing unit to function as a plurality of circuits 106–112. When reading the programming instructions, the processing unit 102 functions as circuit 106 to receive DVD video data and subpicture data from a DVD source. The processing unit 102 then functions as a circuit 108 to store a frame of DVD video and at least a partially decoded portion of the DVD subpicture data 108. Note that a frame of data equates to a full screen of data which is displayed at the display rate of the given display device. For example, if the display rate of a computer device is 60 hertz, a frame is displayed for 1/60th of a second on the computer display. The next frame is displayed in the subsequent 1/60th of a second and so on.

The processing unit 102 then functions as a circuit 110 to scale the DVD video, which it retrieves, from the memory. The processing unit 102 then functions as a circuit 112 to decode and scale the partially decoded DVD subpicture data. Circuits 110 and 112 decode their respective information and provide it, in a scaled format, to circuit 114. Circuit 114 blends the scaled video information with the scaled subpicture information to produce a video output. The functions of the processing unit while performing the programming instructions stored in the memory 104 will be discussed in greater detail with reference to FIG. 5.

The subpicture scaling module 120 includes a processing unit 122 and memory 124. The processing unit 122 is a microprocessor, a microcontroller, a digital signal processor, a microcomputer, a central processing unit, and/or any other device that manipulates digital information based on programming instructions. The memory 124 is a read-only memory, a random access memory, a floppy disk memory, a hard drive memory, a magnetic tape memory, and/or any other means for storing and subsequently retrieving digital information.

The memory 124 stores programming instructions that, when read by the processing unit 122, causes the processing unit 122 to function as a plurality of circuits 126–132. While executing the programming instructions, the processing unit 122 functions as circuit 126 to store partially decoded pixel data, which is representative of partially decoded DVD subpicture data The processing unit then functions as circuit 128 to decode the partially decoded pixel data to produce color data and blending data. Next, the processing unit 122 functions as circuit 130 to generate color information from the color data. The processing unit 122 then functions as circuit 134 to blend the pixel color information based on the blending data. Having done this, the processing unit then functions as circuit 132 to scale the blended pixel information. The functionality of the processing unit while performing these programming instructions will be discussed in greater detail with reference to FIGS. 6 and 7.

Figure 5:
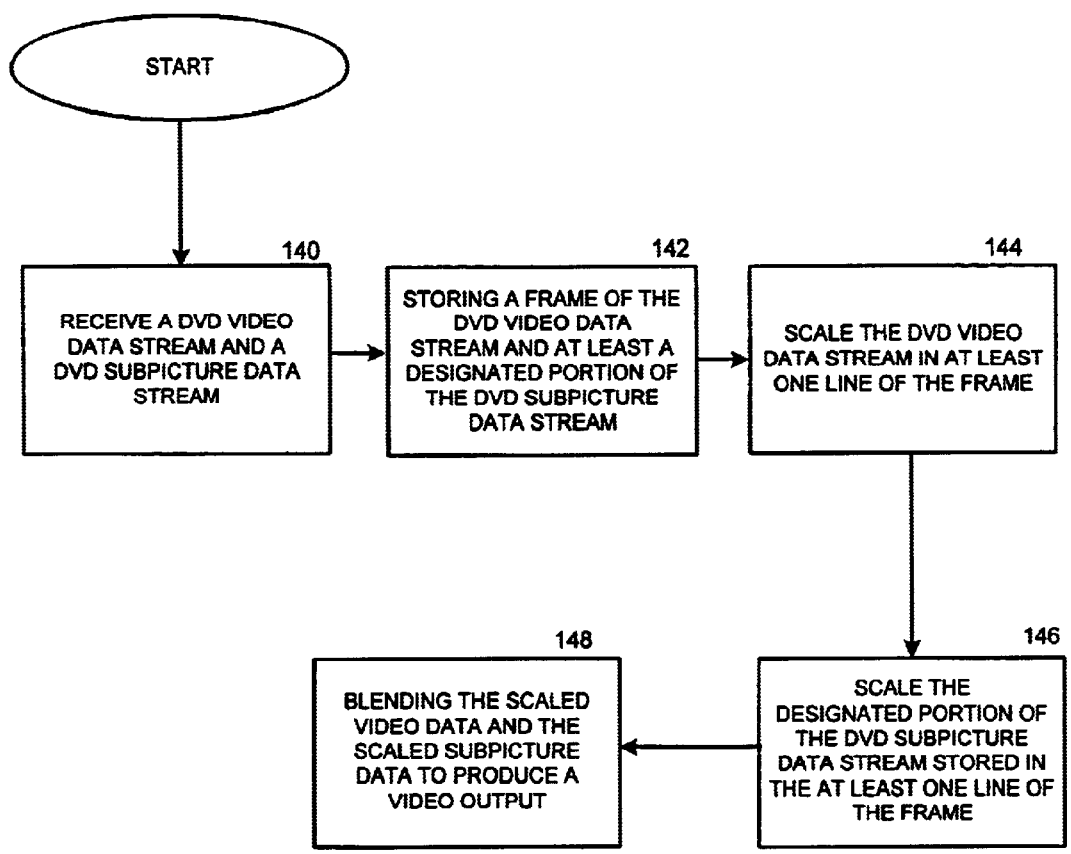
FIG. 5 illustrates a logic diagram of a method for video processing in accordance with the present invention.

FIG. 5 illustrates a logic diagram of a method for processing DVD video data and DVD subpicture data. The process begins at step 140 where a DVD video data stream and a DVD subpicture data stream are received. The process then proceeds to step 142 where a frame of the DVD video data and at least a partially decoded portion of the DVD subpicture data stream are stored. Note that the DVD subpicture data being stored is based on a user selection of the DVD subpicture data. As previously mentioned, DVD subpictures may be representative of control buttons, editor's comments, jumping to different titles or chapters within the DVD video data, etc. As such, the subpicture data may be dependent on user inputs, automatically displayed, or some combination thereof.

The process then proceeds to step 144 where at least one line of the DVD video data stream is scaled to produce scaled video data The process then proceeds to step 146 where at least one line of the partially decoded portion of the DVD subpicture data is scaled to produce scaled subpicture data. Such scaling is based on a ratio between the display size of the video source and the display size of the video target. Having scaled both the DVD video data and the DVD subpicture data, the process proceeds to step 148. At step 148, the scale video data and the scale subpicture data is blended to produce a video output.

Figure 6:
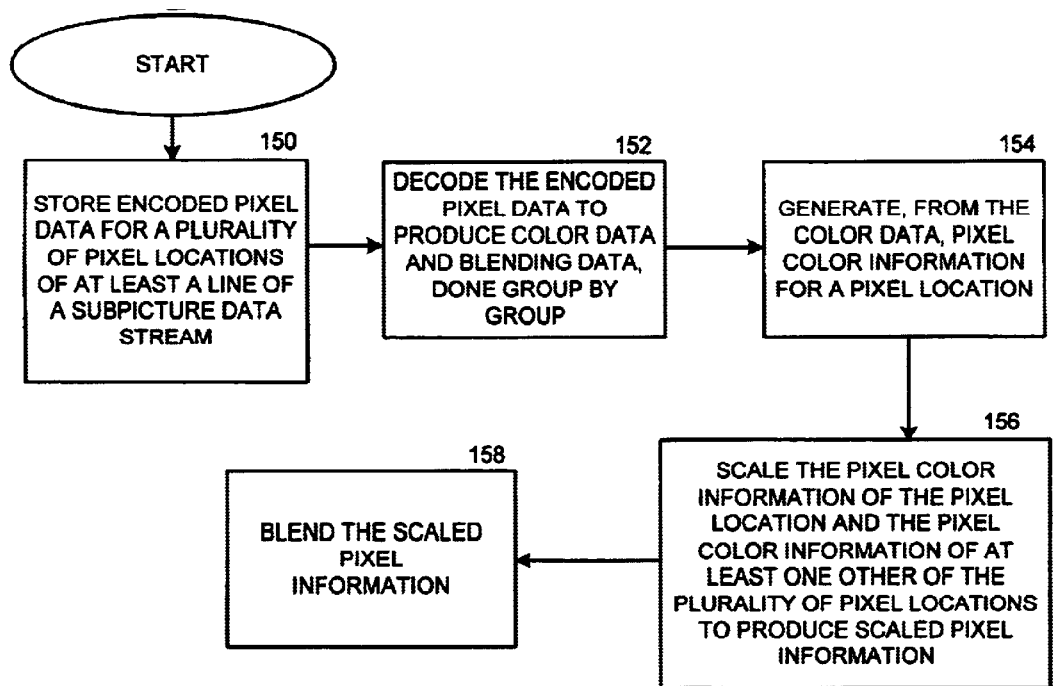
FIG. 6 illustrates a logic diagram of a method for blending and scaling sub-picture video data and video data in accordance with the present invention.

FIG. 6 illustrates a logic diagram of a method for scaling and blending DVD subpicture video data. The process begins at step 150 where partially decoded pixel data that corresponds to a plurality of pixel locations of at least one line of subpicture data is stored. The process then proceeds to step 152 where the partially decoded pixel data is decoded to produce color data and contrast information. Decoding is done on a group of pixels by group of pixels basis and on the color change values 82 which were illustrated in FIG. 3. The process then proceeds to step 154 where pixel color information for a particular pixel location is generated from the color data. The generation of pixel color information may be done by identifying one of a plurality of color palettes from the color data wherein each of the plurality of color palettes includes a plurality of colors. Once one of the plurality of color palettes have been identified, one of the plurality of colors may be subsequently identified.

Figure 7:
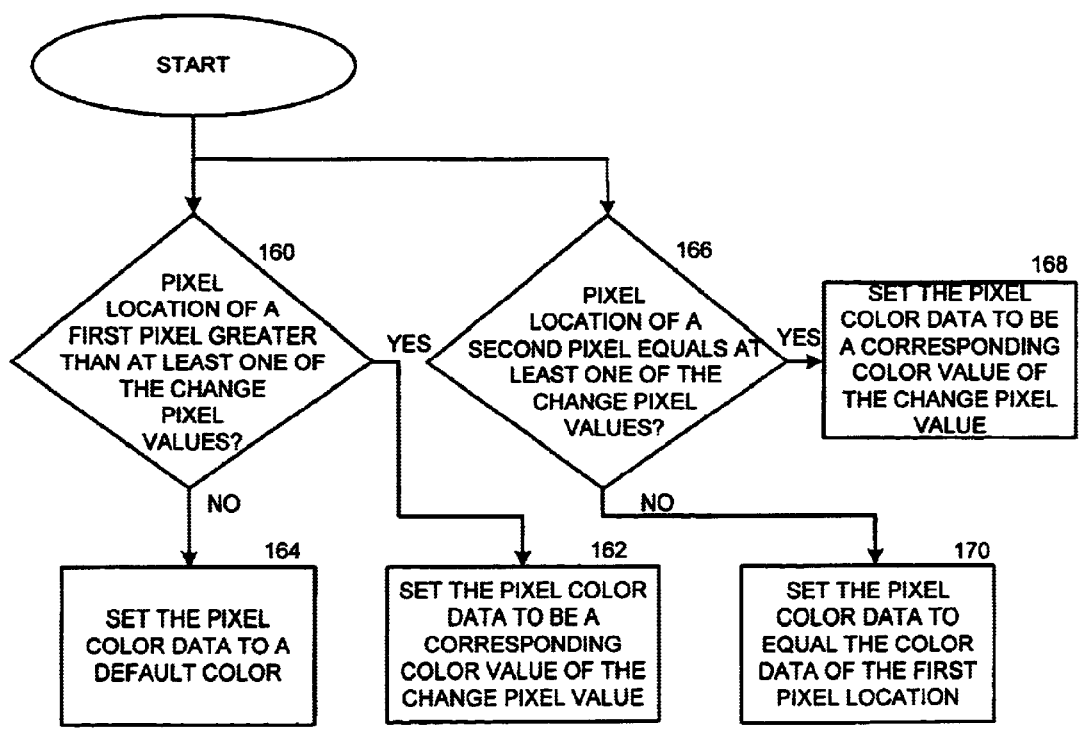
FIG. 7 illustrates a logic diagram of a method for determining color data in accordance with the present invention.

The process then proceeds to step 156 where the color information of pixels locations are scaled to produce scaled pixel information. The scaling is based on a ratio between the display size of a video source and a display size of a video target. The process then proceeds to step 158 where the scaled pixel information is blended. The blending of pixel information may be done in a vertical direction such that pixel locations in the same column are blended with pixels in different rows, in a horizontal direction where pixel locations in the same row are blended with pixel locations in different columns, or in combination thereof FIG. 7 illustrates a logic diagram of a method for determining pixel color information. The process begins at step 160 where a determination is made as to whether a pixel location representing a first pixel is greater than at least one of the change pixel values. If yes, the process proceeds to step 162 where the pixel color data is set to be a corresponding color value of the change pixel value. If not, the process proceeds to step 164 where the color pixel data is set to a default color. The processing steps of 160 through 164 may be illustrated by an example algorithm, where $x_n$ and $x_{n+1}$ are the pixel location of two pixels being processed and $z_n$ and $z_{n+1}$ are the final pixel colors for the two pixels being processed, the algorithm includes the steps of:

if $x_n$ is greater than or equal to H, then $z_n$ equals color H,
    Else if $x_n$ is greater than or equal to G then $z_n$ equals color G,
    Else if $x_n$ is greater than or equal to F then $z_n$ equals color F,
    Else if $x_n$ is greater than or equal to E then $z_n$ equals color E,
    Else if $x_n$ is greater than or equal to D then $z_n$ equals color D,
    Else if $x_n$ is greater than or equal to C then $z_n$ equals color C,
    Else if $x_n$ is greater than or equal to B then $z_n$ equals color B,
    Else if $x_n$ is greater than or equal to A then $z_n$ equals color A,
    Else $z_n$ equals default color.

The process performs steps 160 and 166 in parallel. Step 160 is performed for pixel location $x_n$ while step 166 is performed for a pixel location $x_{n+1}$. At step 166, a determination is made as to whether the pixel location of a second pixel equals at least one of the changed pixel values. If yes, the process proceeds to step 168 where the pixel color data is set to be a corresponding color value of the changed pixel value. If not, the process proceeds to step 170 where the pixel color data is set to equal the pixel color data of the first pixel location. As an example of an algorithm that would perform steps 166 through 170, the following applies:

If $x_{n+1}$ equals H, then $z_{n+1}$ equals color H.
    Else if $x_{n+1}$ equals G, then $z_{n+1}$ equals color G,
    Else if $x_{n+1}$ equals F, then $z_{n+1}$ equals color F,
    Else if $x_{n+1}$ equals E, then $z_{n+1}$ equals color E,
    Else if $x_{n+1}$ equals D, then $z_{n+1}$ equals color D,
    Else if $x_{n+1}$ equals C, then $z_{n+1}$ equals color C,
    Else if $x_{n+1}$ equals B, then $z_{n+1}$ equals color B,
    Else if $x_{n+1}$ equals A, then $z_{n+1}$ equals color A,
    Else $z_{n+1}$ equals $z_n$.

The preceding discussion has presented a method and apparatus for blending of DVD subpicture information with DVD video data. Such blending is done with a substantial reduction in memory requirements in that the DVD subpicture data is stored in an encoded format. The encoded information is processed by a decoding circuit and subsequently blended. By storing the DVD video data and DVD subpicture data in encoded format, the memory requirements for a video processing circuit is substantially reduced.

What is claimed is:

1. A video processing circuit comprises:
   DVD module that receives a DVD data stream and converts the DVD data stream into a video data stream and a subpicture data stream;
   memory that stores a frame of the video data stream and a partially decoded representation of the subpicture data stream;
   a videos-scaling module operably coupled to the memory, wherein the video scaling module receives at least one line of the frame of the video data stream and produces therefrom scaled video data;
   a subpicture scaling module operably coupled to the memory, wherein the subpicture scaling module receives at least a line of the partially decoded representation of the subpicture data stream and produces therefrom scaled subpicture data; and
   a blending module operably coupled to receive the scaled video data and the scaled subpicture data and to produce therefrom a video output.

2. The video processing circuit of claim 1 further comprises, within the subpicture scaling module, a subpicture line buffer that stores the at least a line of the partially decoded representation of the subpicture data stream.

3. The video processing circuit of claim 2 further comprises, within the subpicture line buffer, the partially decoded representation of the subpicture data stream includes 2 bits of information per pixel.

4. The video processing circuit of claim 2 further comprises the subpicture scaling module decoding the partially decoded representation of the subpicture data to recapture subpicture pixel information.

5. The video processing circuit of claim 4 further comprises the subpicture scaling module decoding at least one pixel of the partially decoded representation based on default color information and pixel color change information.

6. The video processing circuit of claim 1, wherein the sub-picture scaling module includes:
  a line buffer that stores encoded pixel data for a plurality of pixel locations of at least a line of a subpicture data stream;
  a pixel decoder operably coupled to the line buffer, wherein the pixel decoder decodes the encoded pixel data to produce color data and contrast information, and wherein the decoding is performed on a group-of-pixel by group-of-pixel basis;
  a pixel data palette operably coupled to the pixel decoder, wherein the pixel data palete receives the color data and generates therefrom pixel color information for a pixel location of the plurality of pixel locations;
  a contrast adjust circuit operably coupled to the pixel data palette and the pixel decoder, wherein the contrast adjust circuit adjusts contrast of the pixel color information of the pixel location based on the contrast information to produce adjusted pixel information; and
  a scaling module operably coupled to the contrast adjust circuit, wherein the scaling circuit scales the adjusted pixel information, and wherein scaling is based on a ratio between display size of a video source and display size of a video target.

7. A method for providing DVD data streams, the method comprises the steps of:
  a) receiving a DVD video data stream and a DVD subpicture data stream;
  b) storing a frame of the DVD video data stream and a partially decoded portion of the DVD subpicture data stream;
  c) scaling the DVD video data stream stored in at least one line of the frame to produce scaled video data;
  d) scaling the partially decoded portion of the subpicture data stream stored in the at least one line of the frame to produce scaled subpicture data; and
  e) blending the scaled video data and the scaled subpicture data to produce a video output.

8. The method of claim 7 further comprises, within step (b), partially decoding the DVD subpicture data to obtain line information.

9. The method of claim 8 further comprises decoding the partially decoded portion of the DVD subpicture data stream prior to the scaling of step (d), wherein the decoding is based on default color information and pixel color change information.

10. The method claim 8, wherein the step of scaling the designated portions of the subpicture data stream includes:
  decoding the encoded pixel data to produce color data and contrast information, wherein the decoding is performed on a group-of-pixel by group-of-pixel basis;
  generating, from the color data, pixel color information for a pixel location of the plurality of pixel locations;
  adjusting the pixel color information of the pixel location based on the contrast information to produce adjusted pixel information; and
  scaling the adjusted pixel information, wherein the scaling is based on a ratio between display size of a video source and display size of a video target.

11. A video processing circuit comprises:
  a processing unit; and
  memory, wherein the memory stores programming instructions that, when read by the processing unit, causes the processing unit to: (a) receive a DVD video data stream and a DVD subpicture data stream; (b) store a frame of the DVD video data stream and a partially decoded portion of the DVD subpicture data stream; (c) scale the DVD video data stream stored in at least one line of the frame to produce scaled video data; (d) scale the partially decoded portion of the subpicture data stream stored in the at least one line of the frame to produce scaled subpicture data; and (e) blend the scaled video data and the scaled subpicture data to produce a video output.

12. The video processing circuit of claim 11 further comprises, within the memory, programming instructions that, when read by the processing unit, causes the processing unit to store the partially decoded portion as 2 bits of encoded information per pixel location.

13. The video processing circuit of claim 12 further comprises, within the memory, programming instructions that, when read by the processing unit, causes the processing unit to decode the partially decoded portion-of the DVD subpicture data stream prior to scaling, wherein the decoding is based on default color information and pixel color change information.

14. The video processing circuit of claim 11, wherein, within the memory, the memory includes programming instructions that, when read by the processing unit, causes the processing unit to (a) store encoded pixel data for a plurality of pixel locations of at least a line of a subpicture data stream; (b) decode the encoded pixel data to produce color data and contrast information, wherein the decoding is performed on a group-of-pixel by group-of-pixel basis; (c) generate, from the color data, pixel color information for a pixel location of the plurality of pixel locations; (d) adjust the pixel color information of the pixel location based on the contrast information to produce adjusted pixel information; and (e) scale the adjusted pixel information, wherein the scaling is based on a ratio between display size of a video source and display size of a video target.

* * * * *